July 7, 1931.  A. A. ROSS  1,813,820
GEAR WHEEL AND THE LIKE
Filed March 5, 1930
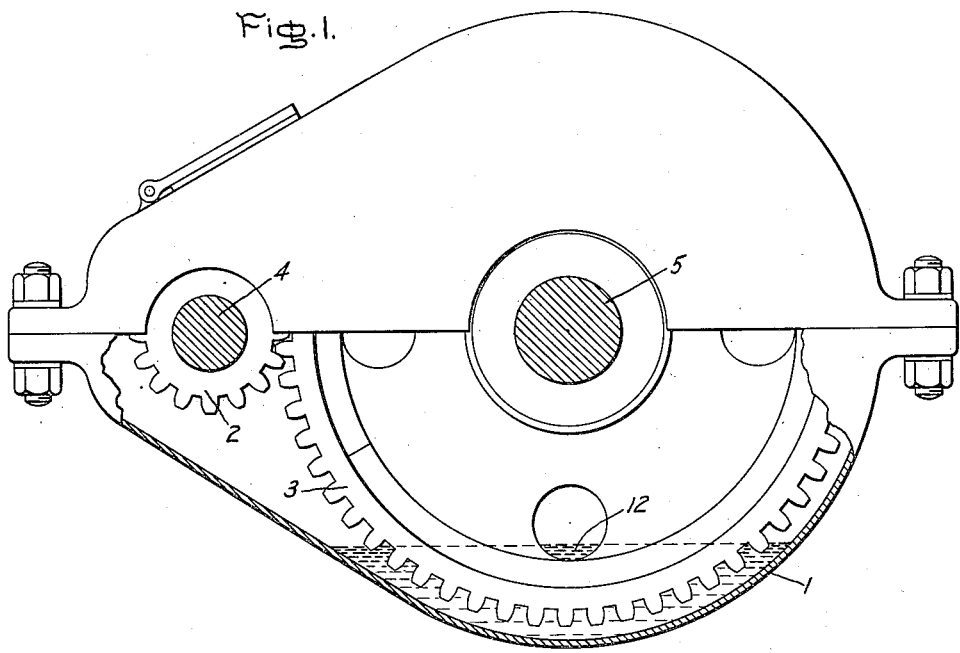
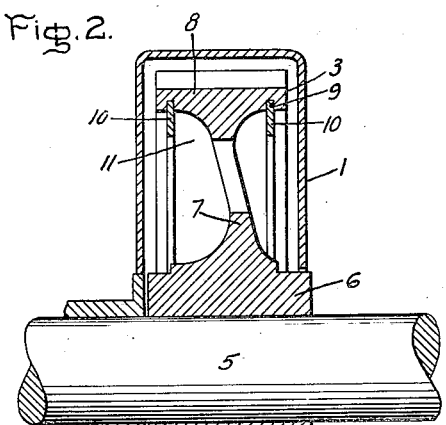
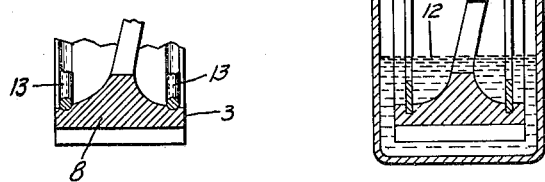
Inventor:
Aubrey A. Ross,
By Charles E. Mulla
His Attorney.

Patented July 7, 1931

1,813,820

UNITED STATES PATENT OFFICE

AUBREY A. ROSS, OF MARBLEHEAD, MASSACHUSETTS, ASSIGNOR TO GENERAL ELECTRIC COMPANY, A CORPORATION OF NEW YORK

GEAR WHEEL AND THE LIKE

Application filed March 5, 1930. Serial No. 433,453.

This application is a continuation in part of my application Serial No. 187,070 filed April 27, 1927.

The invention relates to metal gear wheels and the like, such as, for example, metal gear wheels used in connection with railway motors, although it is not limited thereto.

In connection with such metal gear wheels, it is desirable to provide a gear wheel structure which is nonresonant, and heretofore various arrangements have been proposed for accomplishing this result. Such arrangements, however, with which I am familiar, have been either difficult and impractical to construct or have added materially to the cost of the gear wheel, and these features have stood in the way of their general adoption and use.

The object of my present invention is to provide an improved construction and arrangement in a gear wheel or the like, which in operation is nonresonant and which can be manufactured at a cost but little, if any, greater than ordinary resonant gear wheels or the like.

For a consideration of what I believe to be novel and my invention, attention is directed to the accompanying description and the claims appended thereto.

In the drawings, Fig. 1 is a side elevation of a casing containing a railway motor gear wheel embodying my invention, and a pinion, the casing being partly broken away; Fig. 2 is a transverse sectional view of the construction shown in Fig. 1; and Fig. 3 is a detail view of a modified construction.

Referring to the drawings, 1 indicates a gear casing in which is located a pinion 2 which meshes with the gear wheel 3, the pinion and gear wheel being carried by suitable shafts 4 and 5. The arrangement illustrated is that of the usual railway motor gear drive. Gear wheel 3, shown in side elevation in Fig. 1 and in section in Fig. 2, embodies my invention.

Referring to Fig. 2, 6 indicates the hub of the gear wheel, 7 indicates the web of the gear wheel, and 8 indicates the tire or rim of the gear wheel. According to the embodiment of my invention illustrated in Fig. 2, I provide on the under side of the tire or rim 8, and preferably on each side of the web, an annular groove 9, and in such groove I insert a ring 10 which may be made of a material the same as or different from that of which the tire is made. In forming the construction, the grooves 9 may be cut around the rim before the gear is treated to harden it. Then, after the gear has been treated, the rings, which may be suitably split, may be snapped into the grooves. The rings 10 function to render the gear wheel nonresonant in that, being pieces separate from the gear wheel and not rigidly and integrally attached to it, they have a period of vibration different from that of the gear wheel itself and hence tend to absorb or dampen out vibration of the gear wheel. In other words, the gear wheel and the rings cooperate to produce a nonresonant structure. It is believed that this absorption or dampening is due to a considerable extent at least to impact between the vibrating bodies, which impact absorbs energy.

In addition, in the case of a gear structure as illustrated in the drawings, the rings 10 serve to form or define pockets 11 which become filled with the thick grease indicated at 12, which is used to lubricate the gear wheel and such grease serves as an additional means capable of absorbing vibration and tending to render the gear wheel nonresonant.

In carrying out the invention it is desirable, in order to obtain the best results, that the ring fit snugly and evenly in the groove. In the case of gears such as railway gears where the gears run in a gear casing containing grease, I have found that if a good fit does not obtain, grease works down into the grooves about the rings filling any voids and giving me the same results as are obtained with a perfect fitting ring. In any case, I may, if found desirable, force grease in around the ring to improve its functioning as a sound-deadening means.

In Fig. 3 is shown a modification wherein the rings 13 inserted in the grooves in the under side of the rim of the gear wheel are circular in cross-section. Otherwise, the construction is similar to that shown in Fig. 2 and functions in a similar manner.

In the case of the construction shown in either Figs. 1 and 2, or in Fig. 3, the rings may be welded together at their ends to prevent any possibility of their coming loose. The rings may be constructed of cold rolled steel or other suitable metal.

While I have described my invention as applied particularly to metal gear wheels, it will be understood that it is not limited thereto necessarily, and that the invention may be applied to disks generally or to other metal devices of a similar character which it is desired to render non-resonant. By the term "disk" is meant any body which is circular in shape.

In accordance with the provision of the patent statute, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. The combination with a resonant metallic body having a groove, of a metallic member having a period of vibration different from that of said body inserted in said groove and held therein without being rigidly and integrally attached to said body whereby it may function to absorb vibration in said body by impact.

2. The combination with a resonant metallic disk having an annular groove therein, of a metallic ring having a period of vibration different from that of said body inserted in said groove and held therein without being rigidly and integrally attached to said body whereby it may function to absorb vibration in said body by impact.

3. The combination with a resonant metallic disk having a rim, of a metallic ring having a period of vibration different from that of said disk located in contact with the rim without being rigidly and integrally attached to said rim whereby it may function to absorb vibration in said body by impact.

4. A gear wheel comprising a web and a rim of resonant metal, said rim being provided with one or more annular grooves in its inner surface, and a metallic ring having a period of vibration different from that of said gear wheel located in each groove without being rigidly and integrally attached to said rim whereby it may function to absorb vibration in said body by impact.

5. The combination with a resonant metallic disk having a rim provided with a groove, of a metallic spring ring having a period of vibration different from that of said disk located in said groove and held therein by the resiliency of the ring whereby the ring may function to absorb vibration by impact.

6. A gear wheel of resonant metal comprising a web and rim, said rim being provided with one or more annular grooves, and a metallic spring ring having a period of vibration different from that of said gear wheel located in each groove and held therein by the resiliency of the ring whereby the ring may function to absorb vibration by impact.

7. The combination of a casing, a resonant metallic gear wheel which runs therein, said gear wheel being provided with grooves, rings having a period of vibration different from that of said gear wheel located in said grooves and held therein without being rigidly and integrally attached to said gear wheel whereby they may function to absorb vibration in said gear wheel by impact, said rings forming with the gear wheel an open pocket, and lubricant in the casing which fills the casing normally to a point above the level of the pocket whereby when the gear wheel is running the pocket becomes filled with lubricant.

In witness whereof, I have hereunto set my hand this 28th day of February, 1930.

AUBREY A. ROSS.

CERTIFICATE OF CORRECTION.

Patent No. 1,813,820.                                         Granted July 7, 1931, to

AUBREY A. ROSS.

It is hereby certified that error appears in the printed specification of the above numbered patent requiring correction as follows: Page 1, lines 69 to 72, strike out "In other words, the gear wheel and the rings cooperate to produce a nonresonant structure." and insert the same to follow after "energy.", in line 75; and that the said Letters Patent should be read with this correction therein that the same may conform to the record of the case in the Patent Office.

Signed and sealed this 1st day of September, A. D. 1931.

(Seal)                                                            M. J. Moore,
                                                                     Acting Commissioner of Patents.